US005721396A

United States Patent [19]

Daoud

[11] Patent Number: 5,721,396

[45] Date of Patent: Feb. 24, 1998

[54] BUILDING CABLE ENTRANCE TERMINAL

[75] Inventor: Bassel H. Daoud, Parsippany, N.J.

[73] Assignee: Lucent Technologies Inc., Murray Hill, N.J.

[21] Appl. No.: 709,565

[22] Filed: Sep. 6, 1996

[51] Int. Cl.⁶ .............................. H01R 13/46; H02G 3/18

[52] U.S. Cl. ............................ 174/59; 220/333; 361/622

[58] Field of Search ........................... 174/48, 50, 50.52, 174/50.53, 50.55, 50.6, 58, 59, 65 R, 37, 38; 220/3.7, 332, 3.8, 342, 4.02, 3.92, 329, 333, 343; 312/300, 327, 328, 329; 361/610, 622, 641

[56] References Cited

U.S. PATENT DOCUMENTS 3,841,032 10/1974 Grannis, III ................................ 52/27

*Primary Examiner*—Kristine L. Kincaid
*Assistant Examiner*—Dhiru R. Patel
*Attorney, Agent, or Firm*—Lester H. Birnbaum

[57] ABSTRACT

A building cable entrance terminal includes a panel section for supporting a number of cable connector parts to be mounted in a determined array on a panel, an entrance compartment for housing connecting portions of a number of incoming cables, and a first hinge arrangement for joining the panel section to the entrance compartment for swinging movement between a closed position where a bottom edge of the panel section is aligned with a top edge of the entrance compartment and a first major surface of the panel is enclosed by the compartment, and an open position where the first major surface is exposed to allow access to the incoming cables and connector parts mounted to stand off of the first major surface. A second hinge arrangement joins a customer access cover to the panel section for swinging movement between a closed position where a top edge of the panel section is aligned with a bottom edge of the cover and a second major surface of the panel opposite the first major surface is enclosed by the cover, and an open position where the second major surface is exposed to allow access only to customer cables and connector parts mounted to stand off of the second major surface.

13 Claims, 4 Drawing Sheets

BUILDING CABLE ENTRANCE TERMINAL

BACKGROUND OF THE INVENTION

1. Field of the Invention

The present invention relates generally to a building entrance terminal for coaxial or fiber-optic cables, and particularly to a building entrance terminal configuration that allows cable connectors and associated surge protectors to be accessed from both sides of a through connector panel.

2.Discussion of the Known Art

Protector modules act to protect sensitive electrical equipment located inside a building from damage caused by high voltage, e.g., lightening surges on incoming electric or telephone lines. For buildings that are serviced with a number of telephone wire pairs, a terminal box is usually fastened to a wall at the point of entry of the wire pairs. The wire pairs are brought into a splice chamber in the box, and are connected to an array of protector module sockets in another part of the terminal box. Each module socket typically has five pins, one of which is connected to a common ground potential. Other socket pins connect to a customer terminal interface block, so that once a module is inserted in a socket, an incoming wire pair is connected with a corresponding wire pair in the building, i.e., the "customer side" wiring.

In addition to cable-delivered television, other communication services are being made available to subscribers in homes and buildings via coaxial or fiber-optic cables. For a building with multiple subscribers, a single communications provider may have to supply as many different cables to the point of building entry as the number of subscribers, to meet each subscriber's ongoing service requirements.

Because coaxial cable feeds are also susceptible to high voltage surges originating outside a subscriber's premises, a need has arisen for a cable connector interface terminal at a point of cable entry in a building, which terminal can also house and ground an array of surge protector modules associated with incoming coaxial cables.

Further, there is a need for a building entrance terminal that allows only authorized service personnel to access incoming or "network side" cables and any associated protector modules, while permitting customers to reach their own cables only up to the point where they connect with the incoming cables.

SUMMARY OF THE INVENTION

According to the invention, a building entrance cable terminal includes panel means for supporting a number of cable connector parts to be mounted in a determined array on the panel means, entrance compartment means for housing connecting portions of a number of incoming cables, and first hinge means for joining the panel means to the entrance compartment means for swinging movement between a closed position where a bottom edge of the panel means is aligned with a top edge of the compartment means and a first major surface of the panel means is enclosed by the compartment means, and an open position where the first major surface is exposed to allow access to the incoming cables and connector parts mounted to stand off of the first major surface. Cover means is provided for enclosing customer cables and their connecting parts, and second hinge means joins the cover means to the panel means for swinging movement between a closed position where a top edge of the panel means is aligned with a bottom edge of the cover means and a second major surface of the panel means opposite the first major surface is enclosed by the cover means, and an open position where the second major surface is exposed to allow access only to the customer cables and connector parts mounted to stand off of the second major surface.

The various features of novelty that characterize the invention are pointed out with particularity in the claims annexed to and forming a part of the present disclosure. For a better understanding of the invention and its operating advantages, reference is made to the accompanying drawing and the descriptive matter in which a preferred embodiment of the invention is illustrated and described.

DETAILED DESCRIPTION OF THE INVENTION

Figure 1:
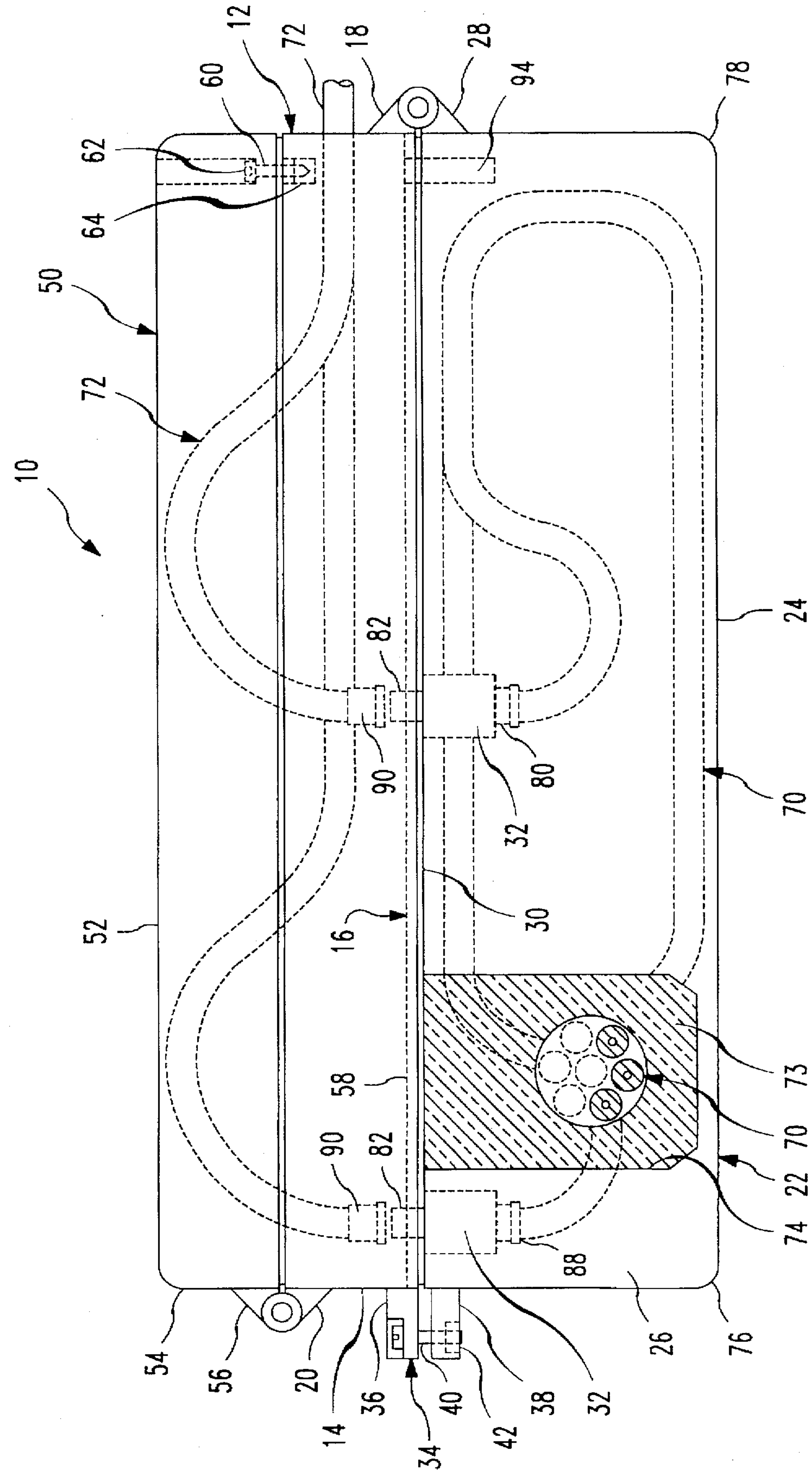
FIG. 1 is a side view of a building entrance terminal according to the invention, shown in a fully closed configuration.

FIG. 1 shows a building entrance terminal 10 according to the invention. Terminal 10 comprises a generally rectangular panel frame 12 having a frame wall 14. Frame 12 is preferably made of an electrically non-conductive material, and is molded, for example, from polycarbonate.

Figure 2:
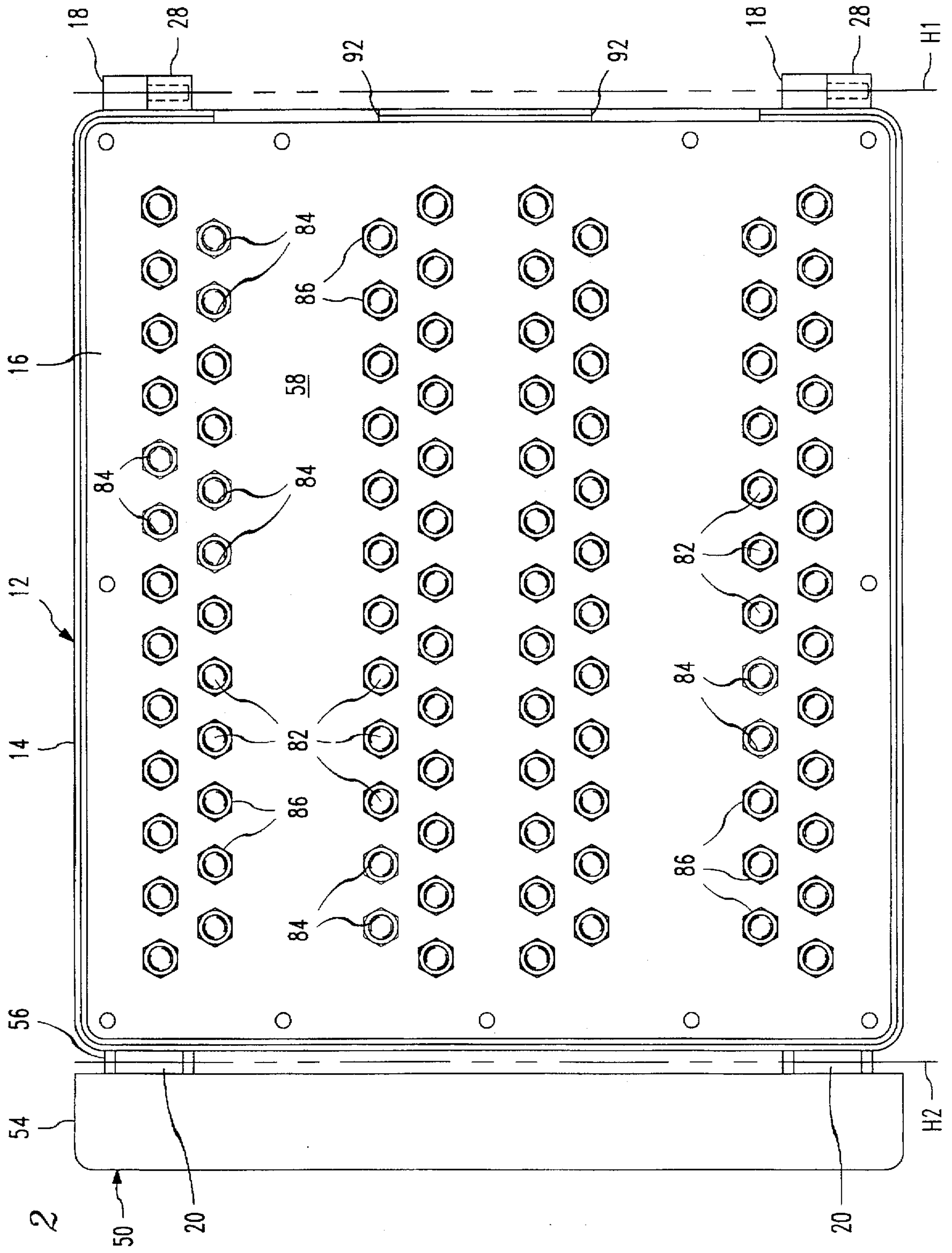
FIG. 2 is a top plan view of a cable connector panel in the terminal of FIG. 1, showing an array of surge protector module connector parts mounted through corresponding panel openings.

FIG. 2 shows a connector panel 16 mounted within the frame 12. The panel 16 is seated securely in the frame 12 at the bottom edge of the frame, as viewed in FIG. 1. A pair of first frame hinge parts 18 protrude from the right side of the frame wall 14, near the frame bottom. The hinge parts 18 coincide with a first hinge axis H1, which is perpendicular to the drawing in FIG. 1. A pair of second frame hinge parts 20 protrude from the left side of the frame wall 14, near the frame top as viewed in FIG. 1. The hinge parts 20 coincide with a second hinge axis H2 which is parallel to the axis H1, and which is also perpendicular to the drawing in FIG. 1.

Figure 3:
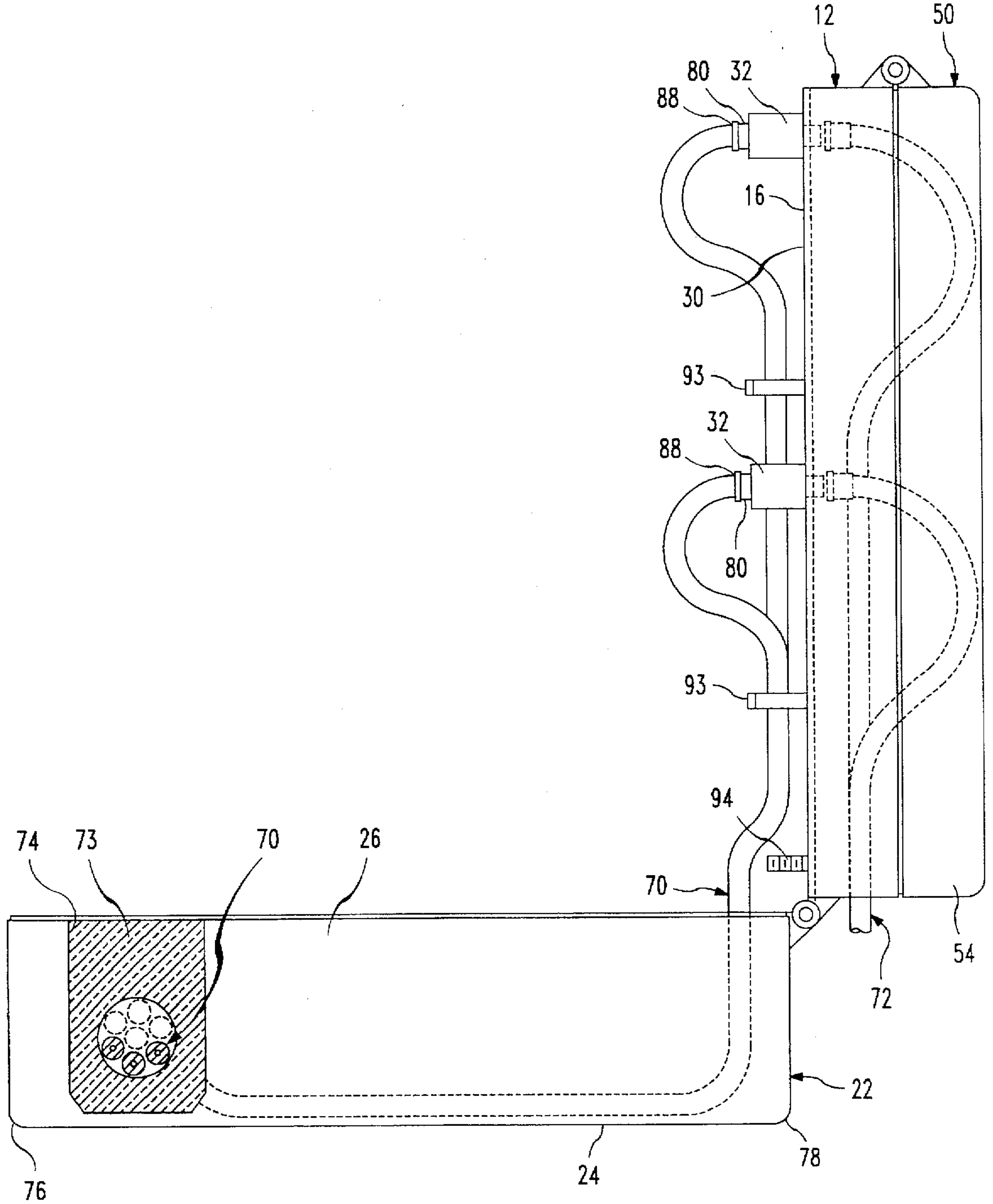
FIG. 3 is a side view of the terminal of FIG. 1, with an entrance compartment cover shown in an open position.

Terminal 10 also includes a cable entrance compartment 22 in the form of a generally rectangular box. The compartment 22 has a closed bottom wall 24, and a compartment side wall 26. Compartment 22 is preferably molded from an electrically non-conductive material such as polycarbonate, and has two hinge parts 28 that protrude from the right side of the wall 26, near the top of the compartment. The hinge parts 28 are constructed and arranged to cooperate with the first hinge parts 18 on the panel frame 12, to enable the frame 12 to swing with respect to the compartment 22 about first hinge axis H1. When the panel frame 12 and the entrance compartment 22 define a closed position as in FIG. 1, the bottom edge of the frame 12 is aligned with the top edge of the compartment 22, and a first major surface 30 of the panel 16 is enclosed by the compartment 22. When the frame 12 and the compartment 22 are brought to a first open position as in FIG. 3, the first major surface 30 is exposed enough to allow access to any parts such as cable surge protector modules 32 standing off of the panel surface 30.

To ensure that only authorized service personnel can access incoming or "network side" cables 70 and cable protector modules 32, a security lock 34 acts to keep the panel frame 12 tight against the cable entrance compartment 22. A first lug member 36 protrudes from the frame wall 14 on the side of wall 14 opposite the hinge part 18, near the bottom edge of the frame 12, as viewed in FIG. 1. A second lug member 38 projects from the compartment side wall 26 on the side of wall 26 opposite the hinge part 28, near the top edge of the compartment 22 and aligned with the first lug member 36 when the frame 12 and compartment 22 are closed (FIG. 1). First lug member 36 has a recessed screw through hole for passage of a security fastener 40 having a specially keyed head. The lower body of the fastener 40 engages a nut 42 that is captured in the second lug member 38. Thus, the fastener 40 can be loosened to unlock the frame 12 from the compartment 22, only by using a special tool adapted to engage the head of the fastener 40.

Figure 4:
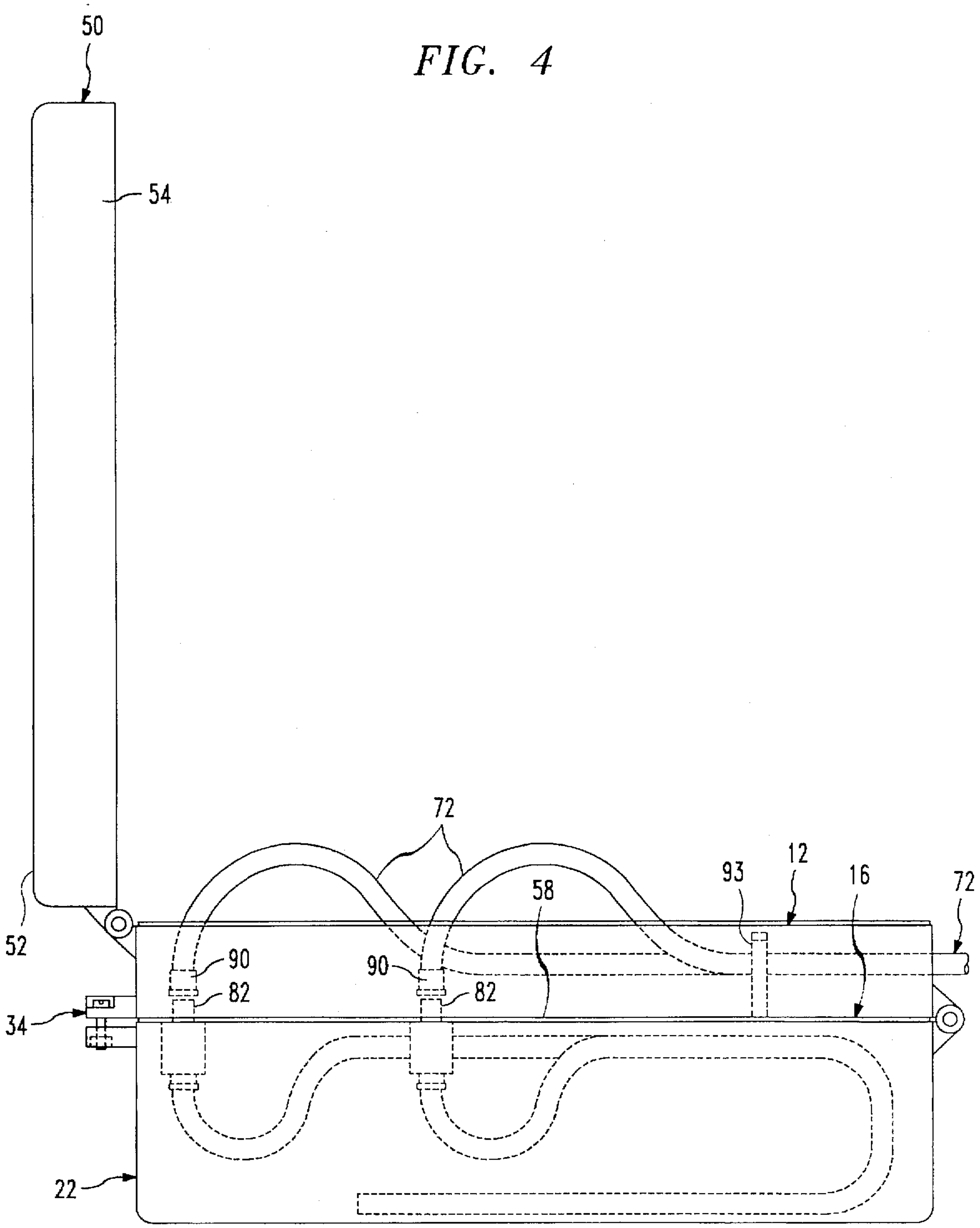
FIG. 4 is a side view of the terminal of FIG. 1, with a customer access cover shown in an open position.

The entrance terminal 10 further includes a customer access cover 50. The cover 50 has a closed top wall 52, and a cover side wall 54. Cover 50 is preferably molded from an electrically non-conductive material (e.g., polycarbonate), with two hinge parts 56 that project from the left side of its wall 54, near the cover bottom edge as viewed in FIG. 1. The hinge parts 56 are constructed and arranged to cooperate with the second hinge parts 20 on the panel frame 12, to enable the cover 50 to swing with respect to the frame 12 about the second hinge axis H2. When the cover 50 and the panel frame 12 are in a closed position (FIG. 1), the top edge of the panel frame wall 14 is aligned with the bottom edge of the cover 50. A second major surface 58 of panel 16, opposite its first major surface 30, is enclosed by the cover 50. When the cover 50 and the panel frame 12 define an open position as in FIGS. 2 and 4, the second major panel surface 58 is exposed enough to allow customer access to the panel surface 58 and only those parts (e.g., cable through connector parts) standing off of the surface 58. As mentioned, access to the opposite side of the panel 16, i.e., the first major surface 30, is achieved only by unlocking the security lock 34 and swinging the panel frame 12 open relative to the cable entrance compartment 22. Opening of the customer access cover 50 does not enable a customer to gain access to any parts standing off of the entrance or network side of the panel 16.

A customer cover lock 60 keeps the cover 50 tight against the panel frame 12, as seen in FIG. 1. A slot head screw 62 travels in a passage formed in the side of the cover 50 opposite the hinge part 56, to engage a nut 64 captured near the top edge of the frame wall 14. The screw 62 can be reached with a common screwdriver, so a customer can open the cover 50 as desired to verify incoming cable service via through connectors on the panel 16, and to test the integrity of customer cables in the building.

In use, the entrance terminal 10 is mounted at a building cable entry location, where connecting portions of a number of the incoming cables 70, e.g., coaxial cables, are to be coupled with connecting portions of corresponding subscriber or customer cables 72 in the building. The entrance compartment 22 is mounted with its bottom wall 24 facing a building wall or other structural surface. A group of the incoming cables 70 pass through a grommet 73 inserted in an entry opening 74 in the compartment side wall 26, near a first corner 76 of the compartment 22. The cables 72 are laid in loop form in compartment 22, running along the inside surface of the bottom wall 24 toward a second corner 78 opposite the first corner 76, turning 90-degrees toward the first major surface 30 of the panel 16, and turning again by 90-degrees to run next to the surface 30 for distribution to the protector modules 32.

Each protector module 32 has a first connector 80, e.g., a male type F at one end of its body, and a second, through connector 82, e.g., a female type F at an opposite end. The ends of the incoming cables 70 are terminated with incoming cable connectors 88 (e.g., female type F) adapted to mate with the first (male) connectors 80 on the modules 32. The second (female) connectors 82 of the modules 32 are then inserted through corresponding openings 84 in the panel 16, and the modules 32 are fixed on the panel by nuts 86 that engage outer threads on the free ends of the second connectors 82.

The ends of the customer cables 72 are terminated with customer cable connectors 90 (e.g., male type F) adapted to mate with corresponding ones of the second (female) connectors 82 standing off of the second major surface 58 or customer side of the panel 16. All the cables 72 are dressed or harnessed to pass through openings 92 in the right side of the frame wall 14, as viewed in FIG. 2. Outside the frame wall 14, the customer cables 72 are routed parallel and close to the first hinge axis H1, so that cable stress and movement is minimized when the panel 16 is swung away from cable entrance compartment 22. Also, the loop form of routing of incoming cables 70 in the compartment 22 permits the cables 70 to swing with the panel 16, without disturbing the cables near the compartment entry opening 74.

The openings 84 in the panel 16 are staggered as shown in FIG. 2, to facilitate finger access to the protector modules 32, and to connector parts mounted in the openings 84. Cable tie strips 93 (FIGS. 3 and 4) may be anchored at certain locations on both major surfaces of the panel 16, to keep both the incoming and the customer cables 70, 72 steady with respect to the panel at all times.

The panel 16 is preferably made of sheet metal to provide a common ground path for the protector modules 32 when their connectors 82 are secured to the panel. A threaded ground stud terminal 94 extends from the panel 16, for connection with a ground wire (not shown) that leads to a suitable building ground.

For fiber-optic cable applications, surge protector modules are not required. Only "feed-through" type fiber optic connectors need be mounted in the panel openings 84 to couple the incoming and the customer cables to one another.

While the foregoing description represents a preferred embodiment of the invention, it will be obvious to those skilled in the art that various changes and modifications may be made, without departing from the spirit and scope of the invention as pointed out by the following claims.

What I claim is:

1. A building cable entrance terminal, comprising:

panel means for supporting a number of cable connector parts to be mounted in a determined array on the panel means;

entrance compartment means for housing connecting portions of a number of incoming cables;

first hinge means for joining the panel means to the entrance compartment means for swinging movement about a first hinge axis between a first closed position where a bottom edge of the panel means is aligned with a top edge of the compartment means and a first major surface of the panel means is enclosed by the compartment means, and a first open position where the first major surface is exposed to allow access to the incoming cables and connector parts mounted to stand off of the first major surface;

cover means for enclosing connecting portions of a number of customer cables;

second hinge means for joining the cover means to the panel means for swinging movement about a second hinge axis between a second closed position where a top edge of the panel means is aligned with a bottom edge of the cover means and a second major surface of the panel means opposite the first major surface is enclosed by the cover means, and a second open position where the second major surface is exposed to allow access only to the customer cables and connector parts mounted to stand off of the second major surface.

2. An entrance terminal according to claim 1, including security fastening means for locking the entrance compartment means to said panel means at said first closed position to prevent unauthorized access to the first major surface of the panel means.

3. An entrance terminal according to claim 1, wherein a wall of said panel means has a customer cable opening for passage of said customer cables, the cable opening being near said first hinge axis so that said customer cables placed outside said wall and aligned with the first hinge axis remain relatively undisturbed when the panel means is swung toward the first open position relative to the entrance compartment means.

4. An entrance terminal according to claim 1, wherein said panel means comprises an electrically conductive sheet, and including ground terminal means on the sheet for connecting said sheet to an electrical ground potential.

5. An entrance terminal according to claim 4, wherein said panel means comprises a frame wall for seating said sheet.

6. An entrance terminal according to claim 5, wherein said frame wall, said entrance compartment means and said cover means are formed of an electrically non-conductive material.

7. An entrance terminal according to claim 6, wherein the non-conductive material is polycarbonate.

8. An entrance terminal according to claim 1, including cable tie means on said panel means for securing said connecting portions of at least one of said incoming cables and said customer cables with respect to the panel means.

9. An entrance terminal according to claim 1, wherein said panel means has a number of connector openings in said determined array.

10. An entrance terminal according to claim 9, wherein said connector openings are staggered relative to one another to facilitate hand access to said connector parts when said parts are mounted in the openings.

11. An entrance terminal according to claim 8, wherein said entrance compartment means has an incoming cable opening for passage of said incoming cables, said incoming cable opening and said cable tie means being located and arranged so that said incoming cables can be maintained in a loop form inside said compartment means to avoid cable strain when the panel means is swung together with the connecting portions of the incoming cables toward said first open position.

12. An entrance terminal according to claim 9, including a number of feed-through cable connector parts mounted in the connector openings in said panel means.

13. An entrance terminal according to claim 9, including a number of cable protector modules having connecting parts inserted through the openings in said panel means, and said panel means includes ground terminal means for applying a ground potential to each of the cable protector modules.

* * * * *